United States Patent
Birks et al.

(10) Patent No.: US 8,302,144 B2
(45) Date of Patent: Oct. 30, 2012

(54) DISTRIBUTION OF CONTENT IN AN INFORMATION DISTRIBUTION SYSTEM

(75) Inventors: David Birks, New Egypt, NJ (US); Michael E. Leimer, Freemont, CA (US)

(73) Assignee: Cox Communications, Inc., Atlanta, GA (US)

( * ) Notice: Subject to any disclaimer, the term of this patent is extended or adjusted under 35 U.S.C. 154(b) by 794 days.

(21) Appl. No.: 10/386,152

(22) Filed: Mar. 11, 2003

(65) Prior Publication Data

US 2003/0192054 A1    Oct. 9, 2003

Related U.S. Application Data

(60) Provisional application No. 60/363,788, filed on Mar. 13, 2002.

(51) Int. Cl.
*H04N 7/173* (2011.01)

(52) U.S. Cl. .......................... 725/116; 725/115; 725/134

(58) Field of Classification Search ............. 725/40–42, 725/51, 91–93, 114–117, 134; 386/109–112
See application file for complete search history.

(56) References Cited

U.S. PATENT DOCUMENTS

| | | | | |
|---|---|---|---|---|
| 5,530,754 A * | 6/1996 | Garfinkle | ........................ | 725/8 |
| 5,566,174 A * | 10/1996 | Sato et al. | ..................... | 370/468 |
| 5,568,181 A * | 10/1996 | Greenwood et al. | ............ | 725/92 |
| 5,606,359 A * | 2/1997 | Youden et al. | .................. | 725/88 |
| 5,619,337 A * | 4/1997 | Naimpally | ...................... | 386/83 |
| 5,721,815 A * | 2/1998 | Ottesen et al. | ................. | 345/721 |
| 5,815,662 A * | 9/1998 | Ong | ................................ | 725/92 |
| 5,966,120 A * | 10/1999 | Arazi et al. | .................... | 345/724 |
| 6,018,359 A * | 1/2000 | Kermode et al. | ............. | 725/101 |
| 6,065,050 A | 5/2000 | DeMoney | | |
| 6,124,878 A * | 9/2000 | Adams et al. | ................. | 725/118 |
| 6,272,109 B1 * | 8/2001 | Pei et al. | ........................ | 370/230 |
| 6,701,528 B1 * | 3/2004 | Arsenault et al. | ............... | 725/89 |
| 2002/0049977 A1 * | 4/2002 | Miller et al. | .................... | 725/82 |
| 2002/0087995 A1 * | 7/2002 | Pedlow, Jr. | ...................... | 725/87 |
| 2002/0174438 A1 * | 11/2002 | Cleary et al. | .................. | 725/100 |
| 2003/0005453 A1 * | 1/2003 | Rodriguez et al. | .............. | 725/87 |
| 2003/0043915 A1 * | 3/2003 | Costa et al. | ............. | 375/240.24 |
| 2003/0123849 A1 * | 7/2003 | Nallur et al. | .................... | 386/68 |
| 2003/0149988 A1 * | 8/2003 | Ellis et al. | ....................... | 725/87 |
| 2004/0060063 A1 * | 3/2004 | Russ et al. | ....................... | 725/46 |

FOREIGN PATENT DOCUMENTS

| | | | |
|---|---|---|---|
| WO | WO 0014953 A1 * | 3/2000 | |
| WO | WO 0059145 A1 * | 10/2000 | |
| WO | WO 0143438 A1 * | 6/2001 | |
| WO | WO 0195621 A1 | 12/2001 | |
| WO | WO 02098134 A1 | 12/2002 | |

OTHER PUBLICATIONS

Supplementary International Search Report issued Dec. 1, 2008, in PCT/US2004/006556 filed Mar. 3, 2004.

* cited by examiner

*Primary Examiner* — Kieu Oanh T Bui

(74) *Attorney, Agent, or Firm* — Merchant & Gould

(57) ABSTRACT

A network personal video recorder (nPvR) supporting PVR functionality in a server-centric environment.

10 Claims, 3 Drawing Sheets

DISTRIBUTION OF CONTENT IN AN INFORMATION DISTRIBUTION SYSTEM

CROSS REFERENCE TO RELATED APPLICATIONS

This application claims benefit of U.S. Provisional Patent Application Ser. No. 60/363,788, which was filed on Mar. 13, 2002 and is incorporated herein by reference in its entirety.

BACKGROUND OF THE INVENTION

1. Field of the Invention

The invention relates to video recording systems and, more particularly, video recording systems utilizing shared client and server resources.

2. Description of the Prior Art

Personal video recorders (PVRs) such as those provided by TIVO® or Replay TV® are known. Such PVRs comprise, essentially, a mass storage device such as a hard disk drive which stores one or more television streams which may then be accessed via a user to effect a VCR-like functionality within the context of live television. While useful, such devices are inherently limited by the number of channels they can process, the total amount to be stored and other parameters due to the number of tuners, amount of mass storage and other factors.

SUMMARY OF THE INVENTION

The subject invention utilizes the combination of centralized storage (i.e., server-side storage such as a mass storage device associated with a stream server) and localized storage (i.e., client-side storage, such as a mass storage device associated with a set-top box (STB)) for efficiently providing a PVR functionality.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of an information distribution system such as a video-on-demand (VOD) system. The exemplary VOD system includes an ability to provide live or prerecorded content to each of a plurality of subscribers within the system (broadcast). Additionally, live or prerecorded content may be distributed to smaller groups of subscribers (narrowcast) or individual subscribers (pointcast).

Figure 1:
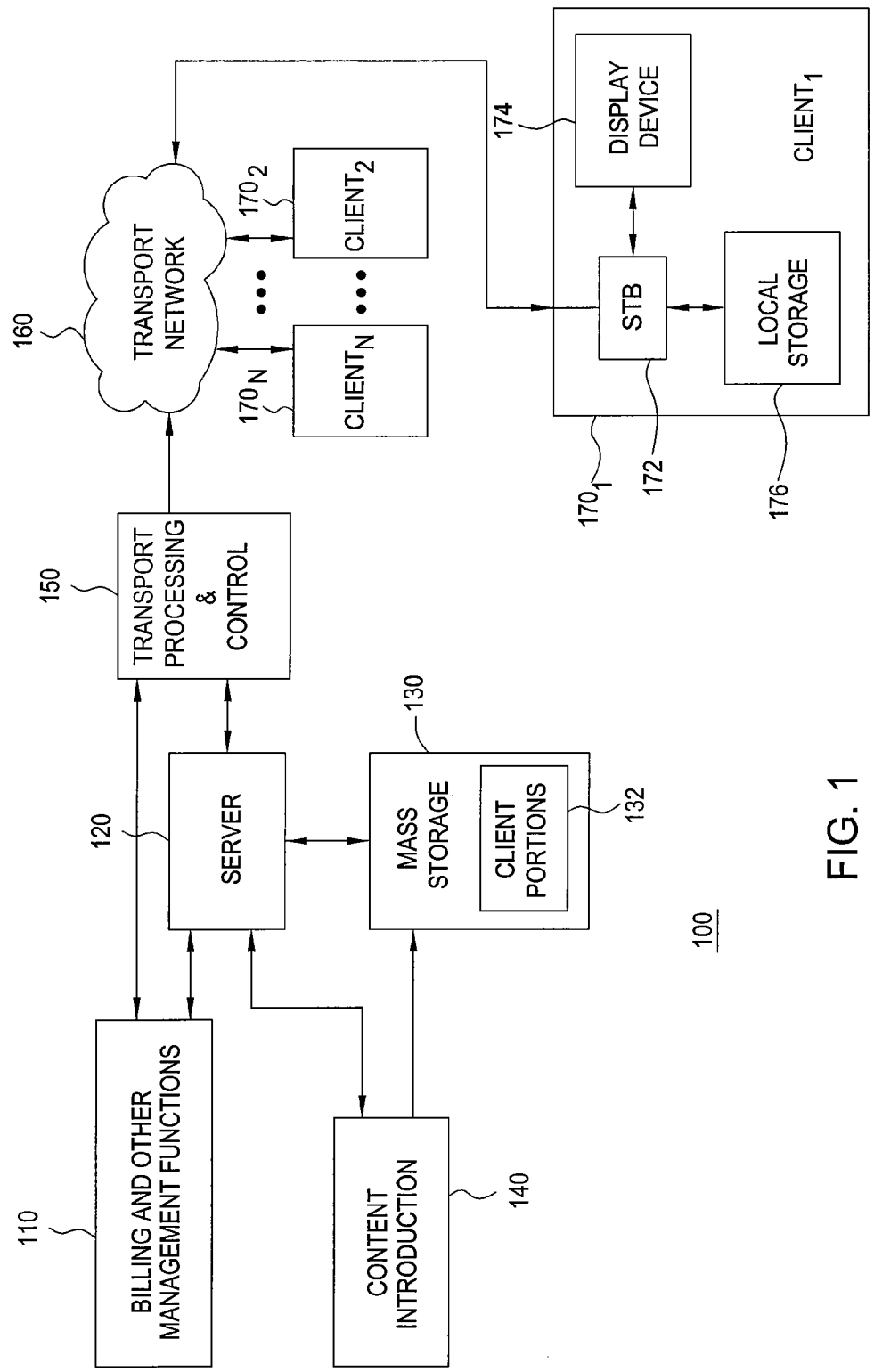
FIG. 1 depicts a high level block diagram of an information distribution system adapted according to the teachings of the present invention.

FIG. 1 depicts a high level block diagram of an information distribution system adapted according to the teachings of the present invention. Specifically, FIG. 1 depicts a high level block diagram of an information distribution system such as a VOD system 100 comprising server-side equipment, client-side equipment and a transport network for communicating therebetween.

The server-side equipment comprises, illustratively, a server 120 which provides broadcast, narrowcast and/or pointcast content streams to one or more of a plurality of clients operatively coupled to a transport network 160. Content streams are initially received via a content introduction point 140 and may be coupled directly to the server 120 for immediate distribution within the system and/or coupled to a mass storage device 130 for subsequent distribution.

The server-side equipment also includes billing and other management functions 110, which functions interact with various server components such as the server 120, transport processing and control module 150 and the like. The transport processing and control unit 150 adapts content streams provided by the server 120 into a form more appropriate to the transport network 160. The transport network 160 propagates content streams via a high bandwidth forward application transport channel (FATC) through the transport network 160 to one or more of a plurality of clients $170_1$ through $170_n$ (collectively clients 170).

The transport network 160 may comprise, illustratively, a cable television transport network, a satellite network or other means suitable for transporting high bandwidth data to one or more clients.

Each of the clients 170 comprises, illustratively, a set top box 172, a display device 174, and a local storage device 176. The set top box 172 performs all functions necessary to decode a content stream received by the forward application transport channel and extract therefrom video and/or audio streams for subsequent presentation by the display device 174. Additionally, the extracted video and/or audio streams may be stored within the local storage device 176. The set top box 172 is responsive to a remote control device (not shown) to selectively tune, demodulate and decode desired content streams. The set top box 172 also interacts with the local storage device 176 to store received content streams in one or more formats both of the transport stream format or an elementary stream format (or even a baseband format). The set top box has bi-directional capability such that a request for the content may be propagated back to the server via a reverse data channel (RDC) within the transport network 160. Additionally, the set top box 172 may receive data from the server via a forward data channel (FDC) supported by the transport network 160.

The functionality of the clients 170 will generally be described within the context of a home personal video recorder (PVR) having specified limitations. However, it will be appreciated by those skilled in the art that these limitations are only applicable to one embodiment of the home PVR. In other embodiments of the home PVR according to the present invention, more or fewer channels may be processed, more or less memory may be included and, generally, increased or decreased PVR functionality may be provided. Also discussed below are services intended to be offered by a content provider, cable television operator (MSO) and the like. Thus, the inventors contemplate specific apparatus and methodology intended to enable the functionality described herein. Additionally, the inventors contemplate a service-layer functionality intended to provide a value-added service to clients or users (subscribers) within the context of an information distribution system such as a VOD system, a cable television system, a satellite television system, and the like.

In one embodiment of the invention, each client 170 has associated with it a portion of the capacity of mass storage device 130. That is, the mass storage device 130 includes client portions 132 which support the storage of content for clients requesting such storage.

In various embodiments of the invention, a client may store the entirety of a content stream within its respective client portion 132 for subsequent retrieval as, for example, a video-on-demand stream.

In another embodiments of the invention, only a portion of the client's content streams are stored at the server. In this embodiment, each client stores an initial portion of desired content in its respective local storage device 176. A remaining portion of the content is stored in the respective client portion 132 of the mass storage device 130. In this manner, a greater apparent number of content streams may be stored for a particular client than the local storage capacity associated with that client would otherwise indicate.

The present invention blends and/or adapts server-side and client-side storage capabilities in a hybrid manner to achieve a desired service level or other goal. In various embodiments of the invention, in-band (IB) and out-of-band (OOB) communication channels are used. The in-band communication channels are those channels within, for example, the forward application transport channel or other channel delivering content to a subscriber(s), such as a high bandwidth forward channel. Out-of-band channels are channels typically separated in terms of spectral allocation, encoding methodology and the like. In one embodiment of the invention, the in-band channel comprises a high level quadrature amplitude modulator (QAM) channel while the out-of-band communication channels (e.g., the FDC and RDC) comprise quadrature phase shift key (QPSK) channels having a different spectral allocation. The in-band and out-of-band channels may share physical media or may be transported via different media (e.g., a plain old telephone system (POTS) communication channel within the context of, for example, a satellite downlink forward application transport channel.

The hybrid approach of the present invention enables VCR-like functionality within the context of streamed live or pre-recorded content which may be stored or otherwise buffered by mass storage devices at the server side or client side. The networked PVR function described herein may be combined with narrowcast transmission to recover unused bandwidth where niche programming is offered. For example, assuming a relatively small number of subscribers wishes to utilize PVR functionality for a particular content stream, the network PVR function may be utilized in conjunction with a narrowcast of the particular content stream rather than a broadcast of the content stream. Additional bandwidth savings may be realized by converting variable bit rate (VBR) streams into constant bit rate (CBR) streams, since CBR streams occupy a known amount of bandwidth, while VBR streams typically occupy a much higher amount of bandwidth. The first two features can be considered part of a "time-shift" viewing model typical of the traditional VCR usage. The last three features are unique to the PVR and involve a live interactivity not possible with the VCR.

Figure 2:
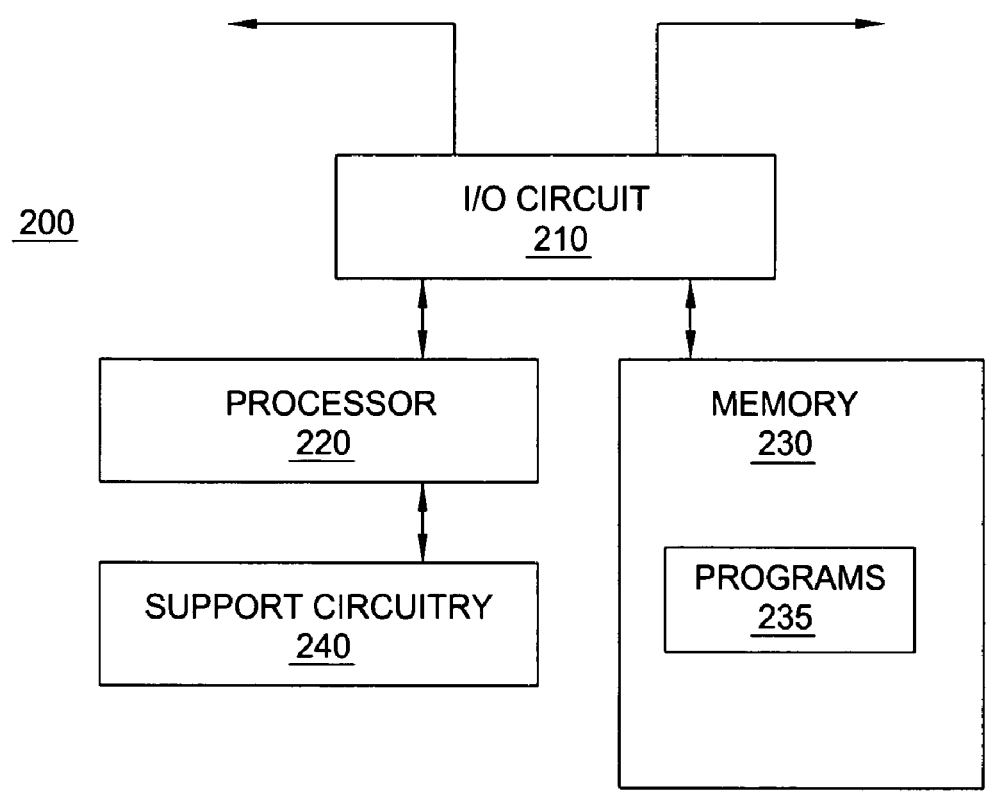
FIG. 2 depicts a high level block diagram of a controller suitable for implementing methods and apparatus according to the present invention.

FIG. 2 depicts a high level block diagram of a controller suitable for implementing methods and apparatus according to the present invention. Specifically, the controller 200 of FIG. 2 is adaptable for use in either the client-side equipment or server-side equipment within the system 100 of FIG. 1. The controller 200 of FIG. 2 is capable of implementing the server functionality of server 120 and the attendant methods, as well as the set top box functionality of STB 172 of the clients 170 and their attendant methods. In one embodiment of the invention, both the server 120 and STB 172 include capabilities such as shown in FIG. 2.

The controller 200 of FIG. 2 comprises a processor 220 as well as memory 230 for storing various programs 235. The processor 220 cooperates with conventional support circuitry 240 such as power supplies, clock circuits, cache memory and the like as well as circuits that assist in executing the software routine stored in the memory 230. As such, it is contemplated that some of the process steps discussed herein as software processes may be implemented within hardware, for example, as circuitry that cooperates with the processor 220 to perform various steps. The controller 200 also contains input/output (I/O) circuitry 210 that forms an interface between the various functional elements associated with the function implemented by the controller 200.

Although the controller 200 of FIG. 2 is depicted as a general purpose computer that is programmed to perform various functions in accordance with the invention, the invention can be implemented in hardware as, for example, an application specific integrated circuit (ASIC). As such, the process steps described herein are intended to be broadly interpreted as being equivalently performed by software, hardware, or a combination thereof.

Figure 3:
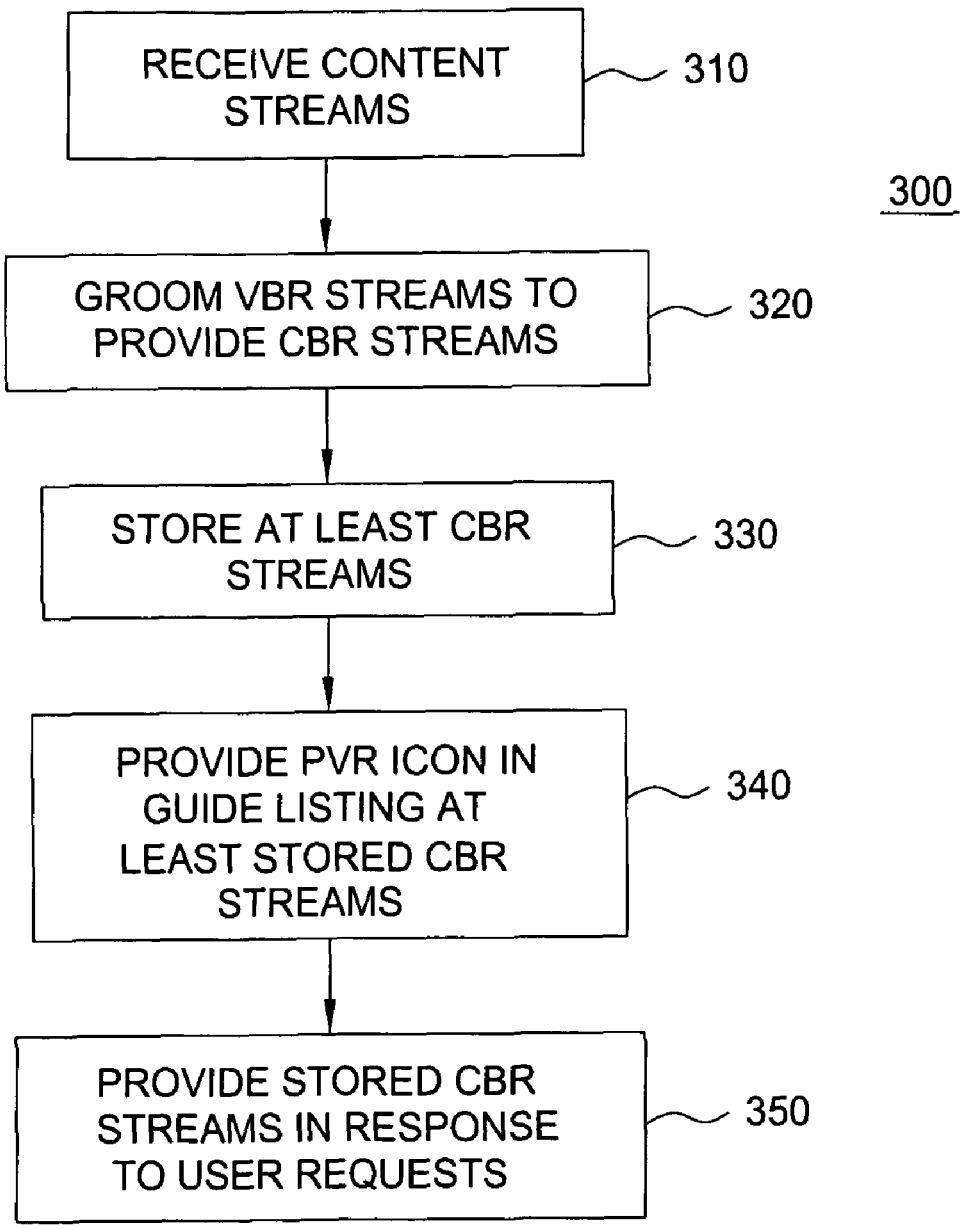
FIG. 3 depicts a flow diagram of a method according to an embodiment of the present invention.

FIG. 3 depicts a flow diagram of a method according to an embodiment of the present invention. Specifically, in method 300 of FIG. 3 a suitable for implementation by the server side equipment within the system 100 of FIG. 1.

The method 300 of FIG. 3 is entered at step 310, when content streams are received. For example, encoded or unencoded content streams may be received via the content introduction point 140 in the system 100 of FIG. 1. Received content streams may comprise analog television streams such as those formed according to the NTSC, PAL or other analog television standards, as well as encoded streams formed according to the MPEG, ATSC or other digital video and/or audio encoding schemes. In the case of encoded received streams, transcoding of the received streams into an appropriate encoded format may be provided. For example, it may be desirable to encode all received streams according to a variable bit rate encoding format to assure a maximum level of quality.

At step 320, the variable bit rate (VBR) streams are groomed to provide constant bit rate (CBR) streams. VBR streams are content streams in which more or fewer bits are allocated to encode pictures depending upon the nature of the content encoded, such as high motion, high detail, low motion, low detail (need fewer bits) and other characteristics. CBR streams are those streams that are encoded at a minimal bit level such that a minimal quality of service (QOS) is provided. VBR streams tend to require more memory than CBR streams. Moreover, the amount of memory required for a CBR stream is more easily predicted than that for a VBR stream.

Optionally, at step 320, the CBR content streams are transcoded to provide fast forward and rewind streams (i.e., trick play streams). The FF and REW streams are formed by, for example, extracting every $n^{th}$ frame (or every I-frame) from the initially encoded play stream and, in the case of the REW stream, reversing the order. The FF and REW streams may be stored at step 330 along with the VBR and/or CBR streams discussed below.

At step 330, at least the CBR streams are stored in a mass storage device. That is, the CBR streams and optionally, the VBR streams (e.g., VBR streams associated with high demand or commonly requested content) are stored in the mass storage device 130 of the system 100 FIG. 1. As previously noted, individual subscribers may have allocated to them portion 132 of the mass storage device 130 for storage of their respective content streams. Thus, at step 330, a first portion of a stream to be stored may be stored in a general server memory area and a remaining portion of a stream to be stored may be stored in an allocated client or subscriber portion of memory. In the case of local (i.e., subscriber site) PVR functionality, the first N/or remaining portions of the content stream may be stored in a local storage device.

At step 340, a PVR Icon is inserted into the electronic program guide to identify those programs that have one or both of a CBR and VBR stream stored. That is, the PVR icon inserted into the program guide enables a user to identify which of the content options presently listed may be viewed in a time-shifted or VCR-like manner. In some instances this may be all of the content available to user, in some instances this may be only the most popular content, in some instances this may be all or the most popular content subject to content provider restrictions (e.g., blackout periods, lockout of FF through commercials, etc.).

At step 350, a stored CBR (or VBR) stream is provided to each user requesting such stream. Where only a single user has requested a content stream, that content stream may be provided to the user using a point cast technique (e.g., the user is the only subscriber receiving the content stream at one time), or a narrow cast technique (the user is one of the few subscribers receiving the content stream).

Optionally, at step 350 the VBR version of a content stream is preferentially provided to a requesting user and, upon a determination that a memory or transport network bandwidth constraint exists, the CBR version of the content stream is provided. Transition between the VBR and CBR versions of a particular content stream occurs at a predefined transition point, where multiple predefined transition points exist within each stream. Additionally, transitioning between FF, REW and play streams occur at similar predefined transition points. Each of these transition points may be determined with respect to an index pointer indicative of the time or number of frames from a first time or frame.

The present invention advantageously provides at least two service options to service providers such as an MSO or DBS provider; namely, time-shifted on demand programming and subscriber directed PVR functionality.

The time-shifted on demand programming option enables an MSO to record and store a subset of its daily programming and offers such programming to subscribers on an on-demand basis. In this manner, a subscription VOD service is offered by an MSO with little or no modifications to an existing provided electronic program guide. Moreover, the amount of storage required to provide this service is relatively small.

The subscriber directed PVR functionality utilizes some integration between existing program guides and the VOD services offered to the subscriber. Additionally, storage needs are increased such as where subscribers record and store niche content (i.e., content not generally viewed by most subscribers). Content requests may also be aggregated to reduce inefficiencies and duplicate storage problems.

For illustrative purposes, it is assumed that 80% of all content requests would be for programming in the 6:00 pm to midnight window on the 10 most popular channels at a 3.75 Mb/sec video rate for standard definition (SD). Assuming other programs would be recorded on request, this would reduce the storage requirements to (3.75×3600×6×10×1.25) or approximately 125 Gbytes per day including a 25% overhead for content outside the primetime window. This number would increase by a factor of approximately five if the content recorded was high definition (HD) quality.

The Network PVR (nPVR) of the invention is able to identify programs so they can be sorted into a guide or to otherwise identify program starts and program ends. The nPVR is also able to detect that a certain program is running late (e.g., a football game goes into overtime). Metadata standards have been deployed for the distribution of content, which standards are optionally used by the nPVR.

VCR functionality of "Live" TV is optionally provided by the nPVR as follows: Pausing "Live" TV implies the ability to re-start playing from the paused position and end up back on the live program if the user catches up. To minimize start-up latency, the pause command causes the STB application to start a session sign-on. A subsequent play command causes steaming of the stored program from the paused position. This function is applied to programming that is being stored as a part of an nPVR program. Activation of storage based on the "Pause" command allows content to be streamed from the pause point due to latencies in the storage process. This latency is increased if a real time encoder or VBR groomer is used as a part of the content storage process. Instant replay also requires the program to already be recording. However, there is no good latency hiding ability as in the pause mode. The session sign on latency will be unavoidable.

The Network PVR (nPVR) of the present invention scales for storage to allow users access to a large quantity of recorded content. It also allows MSOs to provide VCR time-shifted functionality to customers with low-end digital set top boxes.

In one embodiment, the network PVR function 13 combined with storage in the set top box to enable the following: (1) Pause, relay and instant record is handled by the storage in the set top box. This reduces the streaming bandwidth and network communications issues described above; (2) A request to time-shift record a program is evaluated by the server to determine if it is best stored on the set-top or at the headend; (3) Archiving services are offered at the headend for long term storage of content; (4) Personalized programming and advertising use a combination of set top and headend storage depending on the popularity of the content; and (5) VOD and SVOD services push popular content down to the set top storage, if the set top is a "trusted" device, so that those services can play from the set top, further reducing peak bandwidth requirements.

In one embodiment the nPVR function is combined with a switched video approach such that niche programming can be offered in narrow-cast manner. In this manner unused bandwidth may be recovered.

In one embodiment of the invention, the server operates to perform real-time encoding of every received analog channel, as well as real-time storing of the encoded analog channels. The encoding comprises various bit rate (VBR) encoding that is optionally groomed into a constant bit rate (CBR) stream to reduce storage and bandwidth requirements. Optionally, trick play functionality is provided by generating fast forward (FF) and/or rewind (REW) encoded streams. A FF stream comprises a standard play stream in which only a portion of the encoded frames are used (e.g., every $9^{th}$ frame). An REW stream comprises an FF stream arranged in a reverse order. Transitioning between play, FF and REW streams is accomplished by indexing into the desired stream based upon the index position of the currently transported or presented stream.

Although various embodiments which incorporate the teaching of the invention have been shown and described in detail herein, those skilled in the art can readily devise many other varied embodiments that still incorporate these teachings.

What is claimed is:

1. A method for distributing content in an information distribution system, comprising:

receiving, at server-side equipment, variable bit-rate (VBR) content streams for distribution to users;

storing the received VBR content streams in a general server memory area of a mass storage device of the server-side equipment;

using the received VBR content stream to create a constant bit-rate (CBR) stream and storing the CBR stream in the general server memory area of a mass storage device of the server-side equipment;

allocating a portion of the mass storage device for a client portion of memory for storage of user content designated for storage at the mass storage device of the server-side equipment and for buffering delivery of content streams from the server-side equipment to the user;

receiving, at the server-side equipment, a user request for delivery of content from the server-side equipment;

determining whether a constraint for delivering VBR content streams to the user exists;

selecting, from content streams stored in the general server memory area of the mass storage device of the server-side equipment, a provisioned content stream for provisioning to the user by selecting to provision a VBR content stream when a constraint is determined not to exist and selecting to provision a CBR content stream when a constraint is determined to exist;

in response to the request for deliver of content by a user and the selecting of a provisioned content stream, determining first and second portions of the provisioned content stream;

storing the first portion of the provisioned content stream in a local storage device of the user and storing the second portion of the provisioned content stream in the allocated client portion of memory of the mass storage device of the server-side equipment; and inserting, into an electronic program guide imagery identifying content stored at the mass storage device of the server-side equipment having a CBR and a VBR stream and at least one icon indicative of available allocated client portion of memory of the mass storage device of the server-side equipment.

2. The method of claim 1, wherein the content streams stored at the mass storage device at the server-side equipment further comprise analog television signals.

3. The method of claim 1, further comprising:

encoding the VBR content streams to produce fast forward (FF) and rewind (REW) encoded content streams; and storing the FF and REW encoded content streams in the in the general server memory area of a mass storage device of the server-side equipment.

4. The method of claim 3, wherein:

in response to receiving a fast forward command from the user, replacing the provisioned content stream with a corresponding FF stream at an index point common to the provisioned content stream and the FF stream.

5. The method of claim 3, wherein:

in response to receiving a rewind command from the user, replacing the provisioned content stream with a corresponding REW stream at an index point common to the provisioned content stream and the REW stream.

6. The method of claim 1 further comprising provisioning services from the server-side equipment including VCR-like functionality applied to content time-shifted on-demand viewing of content and selectable long term storage of content.

7. The method of claim 1 further comprising using a point cast technique to deliver requested content when content stored at the mass storage device is requested by a single user.

8. The method of claim 1 further comprising using a narrow cast technique to deliver requested content when content stored at the mass storage device is requested by a plurality of users representing a predetermined size subset of subscribers to the information distribution system.

9. The method of claim 1, wherein the content streams stored in the general server memory area of a mass storage device of the server-side equipment comprises a subset of daily programming for provisioning to users on an on-demand basis via selection of a time-shifted on demand programming option from a program guide.

10. The method of claim 1 further comprising evaluating, by the server-side equipment, requests for storing content by the user to determine whether to store requested content at the local storage device or at the mass storage device of the server-side equipment.

* * * * *

UNITED STATES PATENT AND TRADEMARK OFFICE
CERTIFICATE OF CORRECTION

PATENT NO. : 8,302,144 B2
APPLICATION NO. : 10/386152
DATED : October 30, 2012
INVENTOR(S) : Birks et al.

It is certified that error appears in the above-identified patent and that said Letters Patent is hereby corrected as shown below:

Col. 6, lines 26-27: "function 13 combined with" should read --function is combined with--

Signed and Sealed this
Second Day of April, 2013

Teresa Stanek Rea
*Acting Director of the United States Patent and Trademark Office*